(12) United States Patent
Vitito (10) Patent No.: US 8,162,395 B2
(45) Date of Patent: Apr. 24, 2012

(54) AUTOMOBILE ENTERTAINMENT SYSTEM

(75) Inventor: Christopher J. Vitito, Lakeland, FL (US)

(73) Assignee: Audiovox Corporation, Hauppauge, NY (US)

( * ) Notice: Subject to any disclaimer, the term of this patent is extended or adjusted under 35 U.S.C. 154(b) by 1116 days.

(21) Appl. No.: 11/272,002

(22) Filed: Nov. 14, 2005

(65) Prior Publication Data

US 2006/0128473 A1  Jun. 15, 2006

Related U.S. Application Data

(63) Continuation of application No. 10/982,896, filed on Nov. 8, 2004.

(60) Provisional application No. 60/517,862, filed on Nov. 7, 2003.

(51) Int. Cl.
*H04N 5/64* (2006.01)

(52) U.S. Cl. .................... 297/217.3; 348/837

(58) Field of Classification Search ............ 297/217.3; 348/61, 148, 837; 381/86
See application file for complete search history.

(56) References Cited

U.S. PATENT DOCUMENTS

| | | | |
|---|---|---|---|
| 3,019,050 A * | 1/1962 | Spielman | 297/217.3 |
| 3,512,605 A | 5/1970 | McCorkle | |
| 4,490,842 A | 12/1984 | Watanabe | |
| 4,635,110 A | 1/1987 | Weinblatt | |
| 4,681,366 A * | 7/1987 | Lobanoff | 297/188.06 |
| 4,690,362 A | 9/1987 | Helgeland | |
| 4,792,183 A | 12/1988 | Townsend, III | |
| 5,161,766 A | 11/1992 | Arima | |
| 5,436,792 A | 7/1995 | Leman et al. | |
| 5,507,556 A | 4/1996 | Dixon | |
| 5,544,010 A | 8/1996 | Schultz et al. | |
| 5,661,632 A | 8/1997 | Register | |
| 5,751,548 A | 5/1998 | Hall et al. | |
| 5,842,715 A | 12/1998 | Jones | |
| 5,850,215 A | 12/1998 | Kamiya et al. | |
| 5,969,939 A | 10/1999 | Moss et al. | |
| 5,982,363 A | 11/1999 | Naiff | |
| 5,986,634 A | 11/1999 | Alioshin et al. | |
| 5,999,880 A | 12/1999 | Okada et al. | |
| 6,007,038 A | 12/1999 | Han | |
| 6,012,785 A | 1/2000 | Kawasaki | |
| 6,021,185 A | 2/2000 | Staron | |
| 6,023,411 A | 2/2000 | Howell et al. | |
| 6,049,450 A | 4/2000 | Cho et al. | |
| 6,059,255 A | 5/2000 | Rosen et al. | |
| 6,092,705 A | 7/2000 | Meritt | |

(Continued)

FOREIGN PATENT DOCUMENTS

FR    2817812    6/2002

(Continued)

OTHER PUBLICATIONS

European Search Report dated Nov. 16, 2010 for Application No. 06773227.1.

(Continued)

*Primary Examiner* — Peter R. Brown
(74) *Attorney, Agent, or Firm* — F. Chau & Associates, LLC (57) ABSTRACT

An automobile entertainment system includes a video system having a video monitor and a video source, and a cradle secured within an automobile. The cradle is shaped and dimensioned for selectively receiving and securely holding the video system.

9 Claims, 7 Drawing Sheets

U.S. PATENT DOCUMENTS

| | | | |
|---|---|---|---|
| 6,105,919 A | 8/2000 | Min | |
| 6,107,933 A | 8/2000 | Endo | |
| 6,116,560 A | 9/2000 | Kim | |
| 6,124,826 A | 9/2000 | Garthwaite et al. | |
| 6,129,321 A | 10/2000 | Minelli et al. | |
| 6,130,727 A | 10/2000 | Toyozumi | |
| 6,186,459 B1 | 2/2001 | Ma | |
| 6,199,810 B1 | 3/2001 | Wu et al. | |
| 6,208,508 B1 | 3/2001 | Ruch et al. | |
| 6,216,927 B1 | 4/2001 | Meritt | |
| 6,259,601 B1 | 7/2001 | Jaggers et al. | |
| 6,263,503 B1 | 7/2001 | Margulis | |
| 6,279,977 B1 | 8/2001 | Chen | |
| 6,292,236 B1 | 9/2001 | Rosen | |
| 6,297,795 B1 | 10/2001 | Kato et al. | |
| 6,339,455 B1 | 1/2002 | Allan et al. | |
| 6,409,242 B1 | 6/2002 | Chang | |
| 6,443,574 B1 | 9/2002 | Howell et al. | |
| 6,464,185 B1 | 10/2002 | Minelli et al. | |
| 6,494,527 B1 | 12/2002 | Bischoff | |
| 6,516,198 B1 | 2/2003 | Tendler | |
| 6,522,368 B1 | 2/2003 | Tuccinardi et al. | |
| 6,530,547 B1 | 3/2003 | Wada | |
| 6,556,435 B1 | 4/2003 | Helot et al. | |
| 6,597,384 B1 | 7/2003 | Harrison | |
| 6,606,543 B1 | 8/2003 | Sproule et al. | |
| 6,608,399 B2 | 8/2003 | McConnell et al. | |
| 6,619,605 B2 | 9/2003 | Lambert | |
| 6,633,347 B2 * | 10/2003 | Kitazawa | 348/837 |
| 6,644,616 B1 | 11/2003 | Tsukuda | |
| 6,663,064 B1 | 12/2003 | Minelli et al. | |
| 6,663,155 B1 | 12/2003 | Malone et al. | |
| 6,678,892 B1 | 1/2004 | Lavelle et al. | |
| 6,683,786 B2 | 1/2004 | Yin et al. | |
| 6,685,016 B2 | 2/2004 | Swaim et al. | |
| 6,690,268 B2 | 2/2004 | Schofield et al. | |
| 6,698,832 B2 | 3/2004 | Boudinot | |
| 6,702,238 B1 | 3/2004 | Wang | |
| 6,714,253 B2 | 3/2004 | Kim et al. | |
| 6,717,798 B2 | 4/2004 | Bell et al. | |
| 6,724,317 B1 | 4/2004 | Kitano et al. | |
| 6,746,065 B1 | 6/2004 | Chan | |
| 6,768,896 B2 | 7/2004 | Tjalldin et al. | |
| 6,769,989 B2 | 8/2004 | Smith et al. | |
| 6,779,196 B1 | 8/2004 | Igbinadolor | |
| 6,791,471 B2 | 9/2004 | Wehner et al. | |
| 6,871,356 B2 | 3/2005 | Chang | |
| 6,889,365 B2 | 5/2005 | Okahara et al. | |
| 6,979,038 B1 | 12/2005 | Cho et al. | |
| 7,040,698 B2 * | 5/2006 | Park et al. | 297/217.3 |
| 7,066,544 B2 | 6/2006 | Tseng | |
| 7,070,237 B2 | 7/2006 | Rochel | |
| 7,084,932 B1 * | 8/2006 | Mathias et al. | 348/837 |
| 7,111,814 B1 | 9/2006 | Newman | |
| 7,117,286 B2 | 10/2006 | Falcon | |
| 7,124,989 B1 | 10/2006 | Lee et al. | |
| 7,201,443 B2 | 4/2007 | Cilluffo et al. | |
| 7,236,213 B2 | 6/2007 | Hoshino | |
| 7,239,040 B2 * | 7/2007 | Kitazawa | 307/10.1 |
| 7,245,274 B2 * | 7/2007 | Schedivy | 345/7 |
| 7,267,402 B2 | 9/2007 | Chang | |
| 7,280,166 B2 | 10/2007 | Nagata et al. | |
| 7,295,921 B2 | 11/2007 | Spencer et al. | |
| 7,448,679 B2 * | 11/2008 | Chang | 297/217.3 |
| 7,679,578 B2 * | 3/2010 | Schedivy | 345/7 |
| 2001/0011664 A1 | 8/2001 | Meritt | |
| 2002/0005917 A1 | 1/2002 | Rosen | |
| 2002/0068543 A1 | 6/2002 | Shah | |
| 2002/0128774 A1 | 9/2002 | Takezaki et al. | |
| 2002/0135974 A1 | 9/2002 | Bell et al. | |
| 2002/0149708 A1 | 10/2002 | Nagata et al. | |
| 2002/0184632 A1 | 12/2002 | Reitmeier | |
| 2002/0186329 A1 | 12/2002 | Tong et al. | |
| 2003/0125873 A1 | 7/2003 | Yamaguchi et al. | |
| 2003/0128505 A1 | 7/2003 | Yin et al. | |
| 2003/0137584 A1 | 7/2003 | Norvell et al. | |
| 2003/0184137 A1 | 10/2003 | Jost | |
| 2003/0192950 A1 | 10/2003 | Muterspaugh | |
| 2003/0226148 A1 | 12/2003 | Ferguson | |
| 2004/0017652 A1 | 1/2004 | Billington et al. | |
| 2004/0061995 A1 | 4/2004 | McMahon | |
| 2004/0085485 A1 | 5/2004 | Schedivy | |
| 2004/0086259 A1 | 5/2004 | Schedivy | |
| 2004/0104905 A1 | 6/2004 | Chung et al. | |
| 2004/0130616 A1 | 7/2004 | Tseng | |
| 2004/0175155 A1 | 9/2004 | Liu | |
| 2004/0189881 A1 | 9/2004 | Cook et al. | |
| 2004/0204130 A1 | 10/2004 | Khazaka et al. | |
| 2004/0212957 A1 | 10/2004 | Schedivy | |
| 2004/0227695 A1 | 11/2004 | Schedivy | |
| 2004/0227696 A1 | 11/2004 | Schedivy | |
| 2004/0227861 A1 * | 11/2004 | Schedivy | 348/837 |
| 2004/0228622 A1 | 11/2004 | Schedivy | |
| 2005/0025466 A1 | 2/2005 | Yen et al. | |
| 2005/0046756 A1 | 3/2005 | Chang | |
| 2005/0066369 A1 | 3/2005 | Chang | |
| 2005/0075783 A1 | 4/2005 | Wolf et al. | |
| 2005/0090288 A1 | 4/2005 | Stohr et al. | |
| 2005/0200697 A1 | 9/2005 | Schedivy et al. | |
| 2005/0278091 A1 | 12/2005 | Burnham et al. | |
| 2006/0061145 A1 | 3/2006 | Strebe et al. | |
| 2006/0107295 A1 | 5/2006 | Margis et al. | |
| 2006/0109388 A1 | 5/2006 | Sanders et al. | |
| 2006/0128303 A1 | 6/2006 | Schedivy | |
| 2007/0052618 A1 * | 3/2007 | Shalam | 345/7 |
| 2007/0153140 A1 | 7/2007 | Kubota et al. | |

FOREIGN PATENT DOCUMENTS

| | | |
|---|---|---|
| FR | 2817812 A1 * | 6/2002 |
| FR | 2801854 | 5/2011 |
| JP | 62231847 | 10/1987 |
| JP | 01300775 | 12/1989 |
| JP | 5050883 | 3/1993 |
| WO | 02073574 | 9/2002 |

OTHER PUBLICATIONS

International Search Report dated Jul. 9, 2006 for PCT/US0515486.
Office Action dated Jul. 18, 2007 for U.S. Appl. No. 10/982,896.
Office Action dated Jan. 7, 2008 for U.S. Appl. No. 10/982,896.
Office Action dated Dec. 22, 2008 for U.S. Appl. No. 10/982,896.
Office Action dated Jan. 6, 2011 for U.S. Appl. No. 11/153,411.
Office Action dated Aug. 31, 2010 for U.S. Appl. No. 11/153,411.
Office Action dated Mar. 9, 2011 for U.S. Appl. No. 11/153,364.
Office Action dated Oct. 15, 2009 for U.S. Appl. No. 11/215,084.
Office Action dated Jan. 6, 2011 for U.S. Appl. No. 11/215,084.
Office Action dated Apr. 6, 2010 for U.S. Appl. No. 11/215,084.

* cited by examiner

AUTOMOBILE ENTERTAINMENT SYSTEM

CROSS REFERENCE TO RELATED APPLICATION

This application is a continuation of U.S. patent application Ser. No. 10/982,896, filed Nov. 8, 2004, entitled "Automobile Entertainment System", which is currently pending, and is based upon U.S. Provisional Patent Application No. 60/517,862, filed Nov. 7, 2003, entitled "AUTOMOBILE ENTERTAINMENT SYSTEM".

BACKGROUND OF THE INVENTION

1. Field of the Invention

The invention relates to an automobile entertainment system. More particularly, the invention relates to an entertainment system integrating a video source and video monitor within the headrest of an automobile or the ceiling of an automobile, wherein the video source and video monitor are detachably secured to the headrest or the ceiling of an automobile.

2. Description of the Prior Art

Entertainment systems for automobiles are well known. As such, many advances have been made in the development of entertainment systems that make the otherwise tedious task of riding in an automobile more bearable. In addition to the development of overhead systems pioneered by the present inventor, systems that mount within the headrest of an automobile have also been developed.

These headrest entertainment systems allow multiple individuals to view a variety of different video sources within the same vehicle. However, and as those skilled in the art will certainly appreciate, it is desirable to provide added versatility to these entertainment system. The present invention attempts to accomplish this by providing a system whereby the video system may be selectively removed from an automobile and used at other locations.

SUMMARY OF THE INVENTION

It is, therefore, an object of the present invention to provide an automobile entertainment system including a video system having a video monitor and a video source, and a cradle secured within an automobile. The cradle is shaped and dimensioned for selectively receiving and securely holding the video system.

It is also another object of the present invention to provide an entertainment system wherein the video source is a DVD player.

It is a further object of the present invention to provide an entertainment system wherein the video system includes electrical connectors shaped and dimensioned for selective engagement with electrical connectors formed within the cradle.

It is yet another object of the present invention to provide an entertainment system wherein the cradle is mounted within a headrest.

It is still another object of the present invention to provide an entertainment system wherein the cradle is secured to a ceiling of the automobile.

It is also an object of the present invention to provide an entertainment system including at least one docking station to which the video system may be selectively secured when not coupled to the cradle.

It is another object of the present invention to provide an entertainment system wherein the video system includes electrical connectors shaped and dimensioned for selective engagement with electrical connectors formed within the docking station.

It is also a further object of the present invention to provide an entertainment system wherein the cradle includes a connecting mechanism for selective attachment of the video system thereto.

It is also an object of the present invention to provide an entertainment system wherein the connecting mechanism includes a release button for selective release of the video system from the cradle.

It is another object of the present invention to provide an entertainment system wherein the connecting mechanism includes a latch member for selective coupling of the video system to the cradle.

Other objects, advantages and salient features of the invention will become apparent from the following detailed description, which taken in conjunction with the annexed drawings, discloses a preferred, but non-limiting, embodiment of the subject invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

With reference to FIGS. 1 to 11, and in accordance with a first embodiment of the present invention, an automobile entertainment system 10 is disclosed. The automobile entertainment system 10 is composed of a series of video and audio components integrated within an automobile 11. In particular, the entertainment system 10 includes a video system 12 detachably mounted within a standard headrest 14 of an automobile 11. The video system 12 generally includes a video monitor 16 for presenting video content and a video source 20 integrated therewith.

Figure 1:
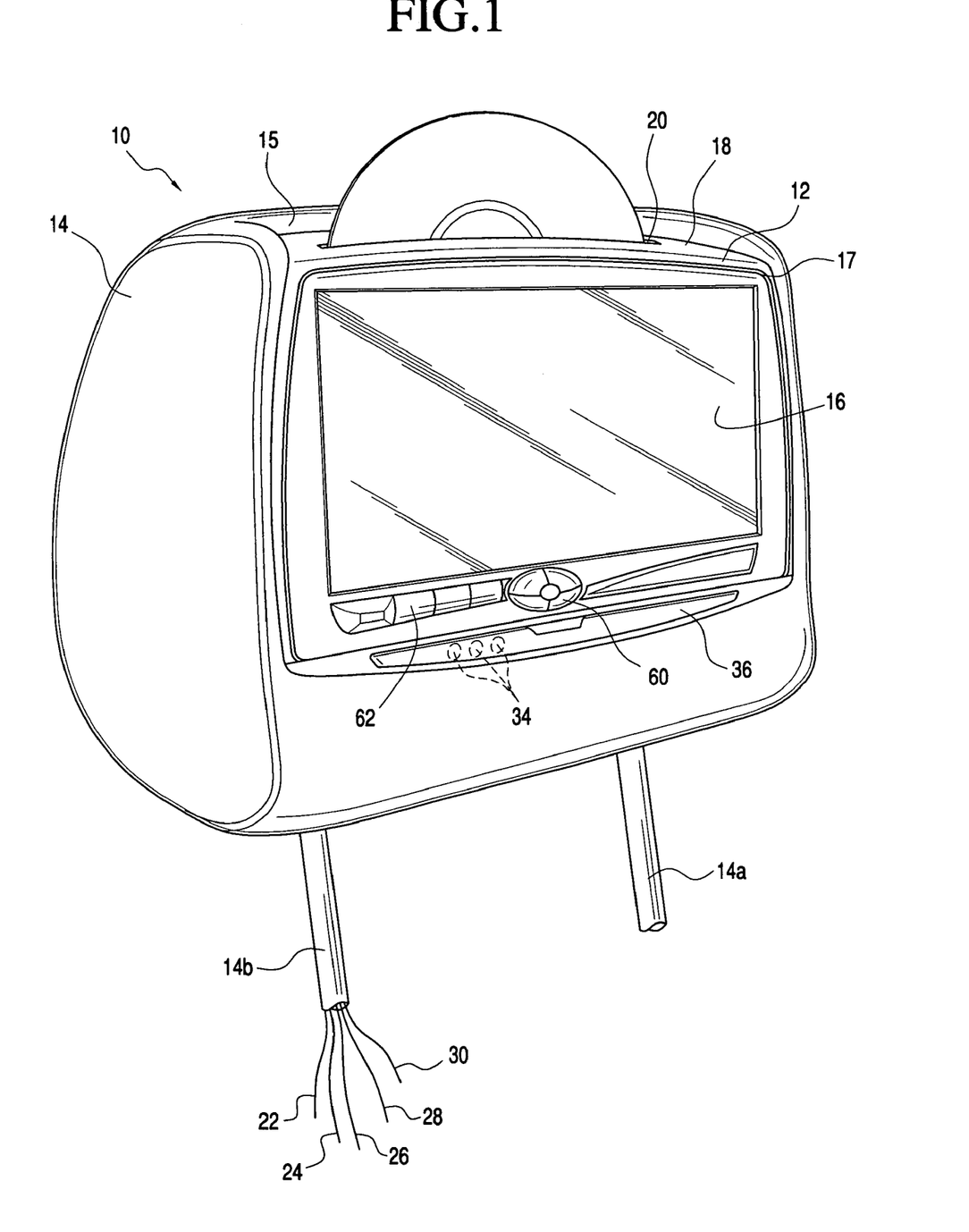
FIG. 1 is a front perspective view of an automobile entertainment system in accordance with the present invention.

In accordance with a preferred embodiment of the present invention, the video source is a DVD player 20 coupled to the video monitor 16 for the transmission of video content thereto. That is, the DVD player 20 or other video source is integrated within the same housing 18 as the video monitor 16. However, and as discussed below in greater detail, the video source may take a variety of forms without departing from the spirit of the present invention; for example, and not limited to, satellite video systems and Bluetooth wireless based systems.

The video system 12 is mounted along the rear portion of the headrest 14 such that an individual sitting in the rear seat of the automobile 11 may watch the media presented on the video monitor 16 without disturbing the driver of the automobile 11.

Figures 2, 3, 4:
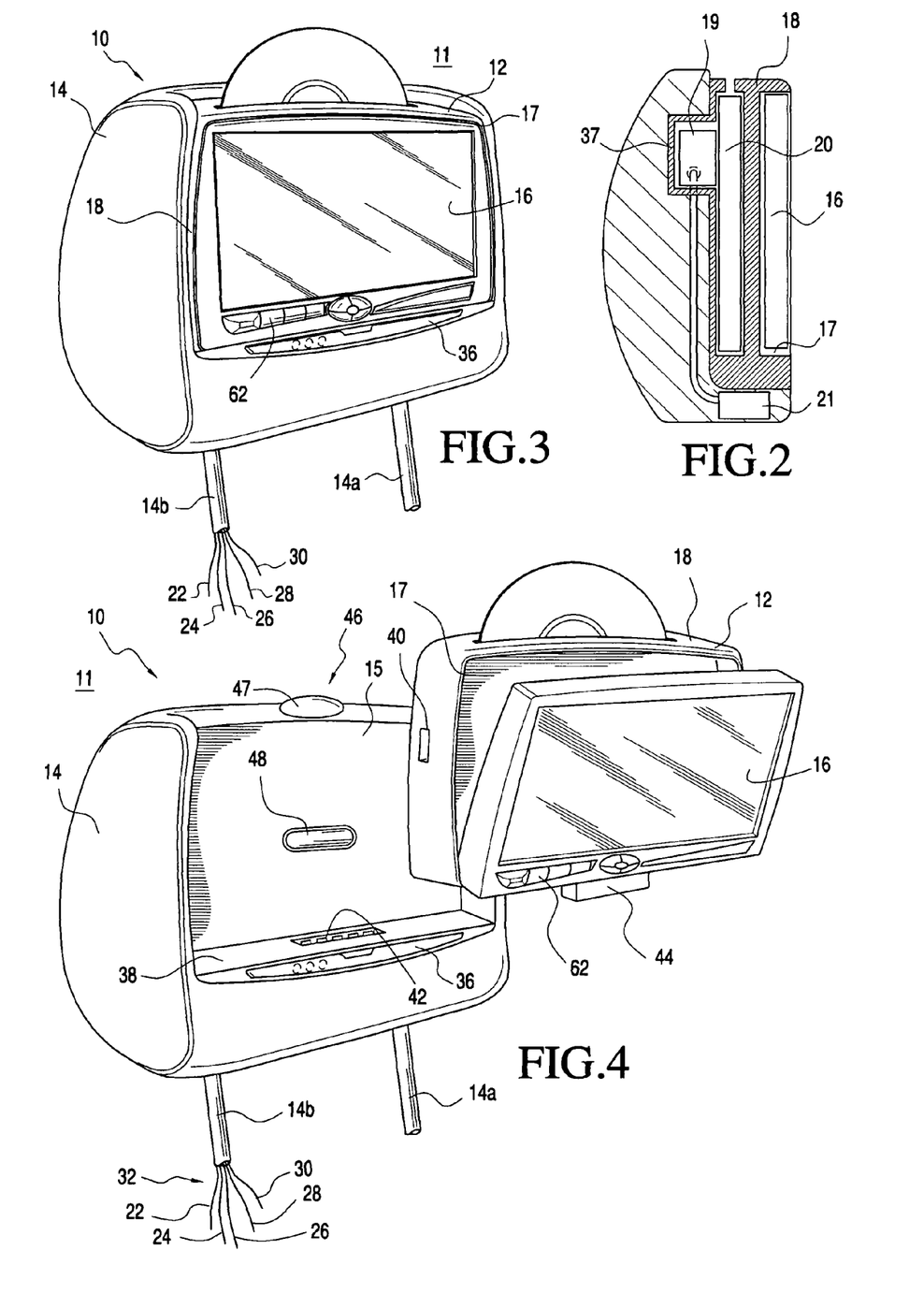
FIG. 2 is a cross sectional view of the housing of the video system shown in FIG. 1.
FIGS. 3 and 4 are front perspective views showing the entertainment system with the video system coupled to the headrest and detached from the headrest.

The video monitor 16, DVD player 20 and associated control components are mounted within the housing 18. As those skilled in the art will certainly appreciate, the video monitor 16 is pivotally mounted within a recess 17 formed in the housing 18. In accordance with a preferred embodiment, the video monitor 16 is a TFT LCD screen. However, it is contemplated that other monitor constructions, for example, plasma, Ultra High Definition VGA, touch screen VGA, fabric based monitors (e.g., flexible TFT) etc., may be used without departing from the spirit of the present invention.

With regard to the DVD player 20, it is integrally molded within the housing 18 and positioned for insertion of DVDs behind the video monitor 16. By mounting the DVD player 20 in this way, a stable structure is developed that is well adapted for the automobile environment.

Figure 5:
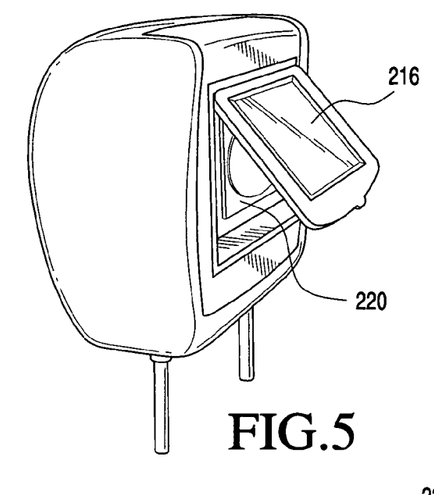
FIGS. 5, 6, 7 and 8 are views of entertainment systems in accordance with alternate embodiments of the present invention.
Figure 6:
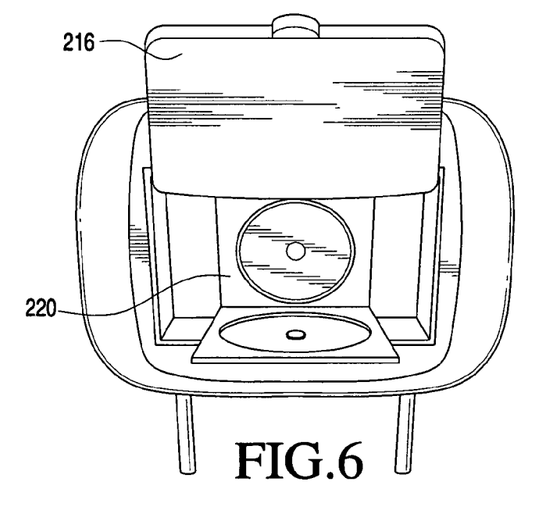
Figure 7:
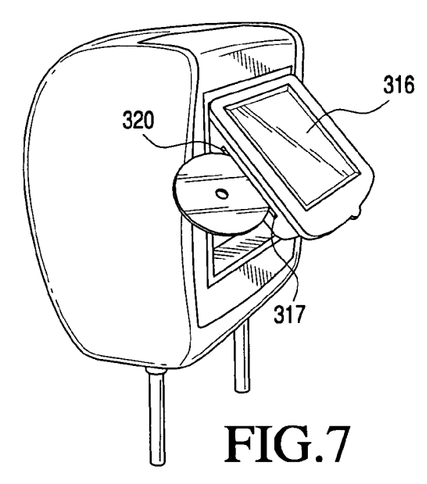
Figure 8:
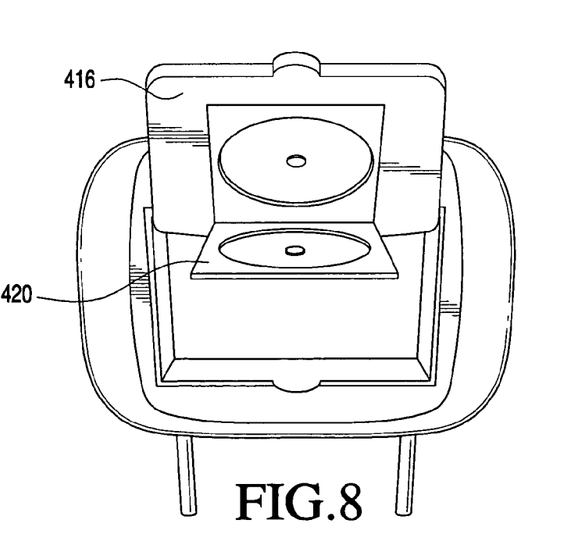

While the DVD player 20 is disclosed as being a slot-loaded design with insertion behind the video monitor, the DVD player could take a variety of other forms while still being integrated with the video monitor 16. With reference to FIGS. 5 and 6, the DVD player 220 may be positioned beneath the pivotally mounted video monitor 216. With reference to FIG. 7, the DVD player 320 may be integrated with the video monitor 316 and facilitate access via a side loading slot 317. Referring to FIG. 8, the DVD player 420 is integrated with the underside of the video monitor 416 and the DVD is snapped into DVD player 420 when the monitor 416 is pivoted upward. In addition, the DVD player may be designed with a built in TV tuner for providing the user with a choice of video sources.

As briefly mentioned above, the housing 18 is detachably secured to the headrest 14. In particular, the housing 18, including the video monitor 16, DVD player 20 and other related components, is detachably mounted within a recess 15 formed in the headrest 14. As such, the video system 12 may be removed from the automobile 11 and used at a variety of locations apart from the automobile 11. As will be discussed below in greater detail, the video system 12 may be used alone or in conjunction with a docking station 50', 50", 50'". Once removed, the video system 12 may be used in other automobiles 11 or within an individual's home. When used alone, a battery pack may be connected to the video system 12 and the video system 12 can thereby become a portable entertainment system.

A cradle 38 shaped and dimensioned for receiving the video system 12 is provided within the recess 15 of the headrest 14. As will be discussed below in greater detail, similar cradles 38', 38", 38'" may be provided at other locations permitting use of the video system 12 at other remote locations. It is contemplated that such a cradle 38, 38', 38", 38'" would be much like the docking stations utilized with laptop computers wherein individuals are permitted to readily remove the laptop from a docking station for use at another location remote from the docking station.

More specifically, the cradle 38 utilized in the headrest 14 includes quick release electrical connections 42 for the audio input 22, audio output 24, video input 26, video output 28 and power supply 30. The video system 12 similarly includes mating electrical connections 44 for transmitting electricity and a/v signals between the cradle 38 and the video system 12. In particular, when the video system 12 is mounted upon the cradle 38, the respectively electrically connections 42, 44 mate to provide for the transmission of power and a/v signals between the video system 12 and the cradle 38. As those skilled in the art will certainly appreciate, other readily removable electrical connections for other purposes may also be supplied if one determines they are so needed.

In addition to the electrical connections 42 provided on the cradle 38, the cradle 38 also includes a connecting mechanism 46 designed for selectively retaining the video system 12 within the cradle 38. The connecting mechanism 46 permits ready and selective attachment of the video system 12 to the headrest 14 while preventing vibrations and other damaging movements that commonly occur in an automobile 11.

In accordance with a preferred embodiment of the present invention, the connecting mechanism 46 includes a release button 47 and a latch member 48. The release button 47 is actuated to rotate the latch member 48 and permit removal of the video system 12 from the cradle 38. Insertion of the video system 12 within the headrest 14 is achieved by simply setting the video system 12 within the cradle 38 and applying sufficient force to the video system for overcoming the rotational force of the latch member 48 to force the video system 12 into a secure position. While a particular coupling structure is disclosed in accordance with a preferred embodiment of the present invention, those skilled in the art will appreciate that a variety of selectively releasable coupling structures may be employed without departing from the spirit of the present invention.

The entertainment system 10 further includes cables 32 extending through the headrest 14. These cables ultimately link audio, video and power to the cradle 38 and video system 12. More specifically, the cradle 38 and video system 12 are electrically connected to the remainder of the automobile 11 via electrical communication lines extending through one or both of the extension arms 14a, 14b of the headrest 14. For example, and as will be discussed below in substantial detail, a video input 22, video output 24, audio input 26, audio output 28 and power source 30, may be respectively connected to the cradle 38 for ultimate connection with the video system 12 via the mating electrical connections 42, 44 of the respective cradle 38 and video system 12.

Specific wiring arrangements and linking of various video systems within an automobile in accordance with preferred embodiments of the present invention are disclosed in U.S. patent application Ser. No. 10/920,425, entitled "AUTOMOBILE ENTERTAINMENT SYSTEM", filed Aug. 18, 2004, which is incorporated herein by reference, U.S. patent application Ser. No. 10/895,111, entitled "AUTOMOBILE ENTERTAINMENT SYSTEM", filed Jul. 21, 2004, which is incorporated herein by reference, U.S. patent application Ser. No. 10/895,110, entitled "AUTOMOBILE ENTERTAINMENT SYSTEM LINKING MULTIPLE VIDEO SYSTEM FOR COORDINATED SHARING OF VIDEO CONTENT", filed Jul. 21, 2004, which is incorporated herein by reference, U.S. patent application Ser. No. 10/895,086, entitled "HOUSING FOR AN AUTOMOBILE ENTERTAINMENT SYSTEM", filed Jul. 21, 2004, which is incorporated herein by reference, U.S. patent application Ser. No. 10/895,099, entitled "INSTALLATION APPARATUS FOR AN AUTOMOBILE ENTERTAINMENT SYSTEM", filed Jul. 21, 2004, which is incorporated herein by reference, U.S. patent application Ser. No. 10/920,431, entitled "AUTOMOBILE ENTERTAINMENT SYSTEM", filed Aug. 18, 2004, which is incorporated herein by reference, and U.S. patent application Ser. No. 10/920,430, entitled "AUTOMOBILE ENTERTAINMENT SYSTEM", filed Aug. 18, 2004, which is incorporated herein by reference.

As briefly mentioned above, a DVD player 20 is integrated with the video monitor 16 to form the video system 12 of the present invention. The DVD player 20 is integrated with the video monitor 16 to facilitate convenient viewing of media on the video monitor 16 while also conserving space within the limited confines of the automobile 11. For example, by integrating the DVD player 20 with the video monitor 16 individuals using the video monitor 16 may conveniently insert DVDs within the video system 12 without reaching within another part of the automobile 11.

With this in mind, it is contemplated the present video system 12 may be positioned within any headrest 14 employed in a car, truck, SUV, or van. The video system 12 may be placed within all vehicle headrests (and, with regard to automobiles having three rows of seats, video systems may be positioned within both the front seat headrests and the second seat headrests). In this way, individuals sitting on opposite sides of an automobile 11 can watch different video content on different video systems 12. In fact, different videos may be viewed, and wireless headphones may still be employed, by utilizing a multi-channel IR transmitter in conjunction with the present system.

The present video system 12 is provided with the ability to offer a variety of functionalities. These functionalities may be hardwired or programmed within the video system 12 or the functionalities may be added in a modular manner via an expansion slot 40 provided within the video system 12. Contemplated functionalities include, but are not limited to satellite radio (for example, Serius, XM), satellite television (for example, DirecTV), GPS guidance systems, quick release battery packs, memory cards, wireless internet access (for example, Wi-Fi), Bluetooth, digital video recorders, digital video reception and recording, digital video inputs, video conferencing, cellular digital, cellular digital with a camera, etc.

Enhanced usage is further provided by the inclusion of RCA ports 34, or other a/v input/outputs, formed within the cradle 38 and contained behind a cover 36 which may be selectively opened to reveal the ports 34. The inclusion of these ports 34 allows for ready attachment of the present video system 12 to other remote a/v sources (for example, game consoles, portable digital music players, etc.).

In addition, and in accordance with a preferred embodiment, a broadcast television receiver 19 is integrated with the video monitor 16 and/or the headrest 14. More particularly, and with reference to FIG. 2, the housing 18 is provided with a rear recess 37 shaped and dimensioned for receiving a television receiver 19. The television receiver 19 may, therefore, be wired for use in conjunction with the video monitor 16 in a manner known to those skilled in the art.

The television receiver 19 is further provided with an antenna 21. The antenna 21 is electrically connected to the television receiver 19 for the transmission of over-the-air signals. The antenna 21 is substantially U-shaped and is wrapped about the housing 18. While a U-shaped antenna wrapped about the housing is disclosed in accordance with a preferred embodiment of the present invention, the antenna may be oriented within a variety of locations within the headrest without departing from the spirit of the present invention.

Control of the video system 12, including the video monitor 16, DVD player 20 and other components of the video system 12, is facilitated by the provision of control buttons along the outer surface of the video system 12. In accordance with a preferred embodiment of the present invention, the control buttons take the form of a multifunction controller 60 permitting movement of a cursor shown upon various interfaces displayed upon the video monitor 16. In addition, conventional control buttons 62 may also be provided for control of traditional functions. In addition to the provision of manual control buttons 62, the video system 12 may further include a remote control (not shown) such that an individual need not actually touch the video system 12 to control the video content or the volume generated by the video system 12. Once again, and as those skilled in the art will certainly appreciate, a variety of remote control systems may be utilized without departing from the spirit of the present invention.

Figure 9:
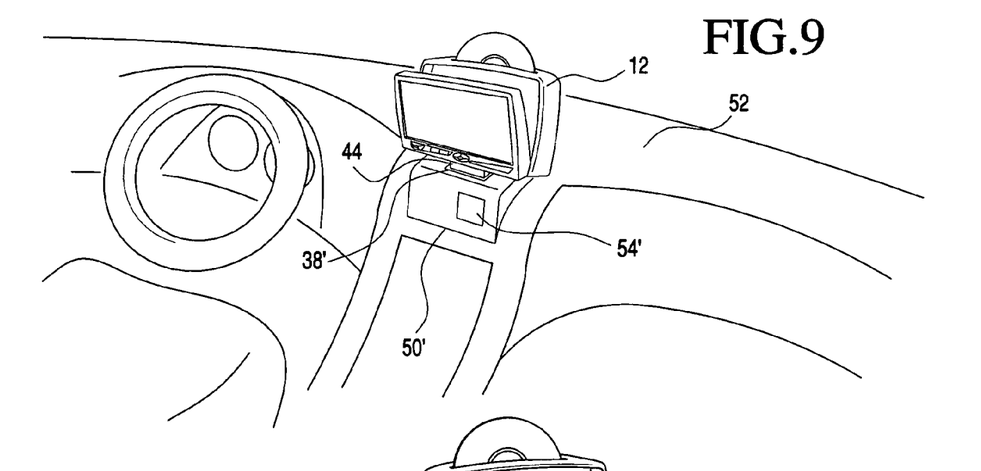
FIG. 9 shows the video system of FIG. 1 mounted within a dash docking station.
Figure 10:
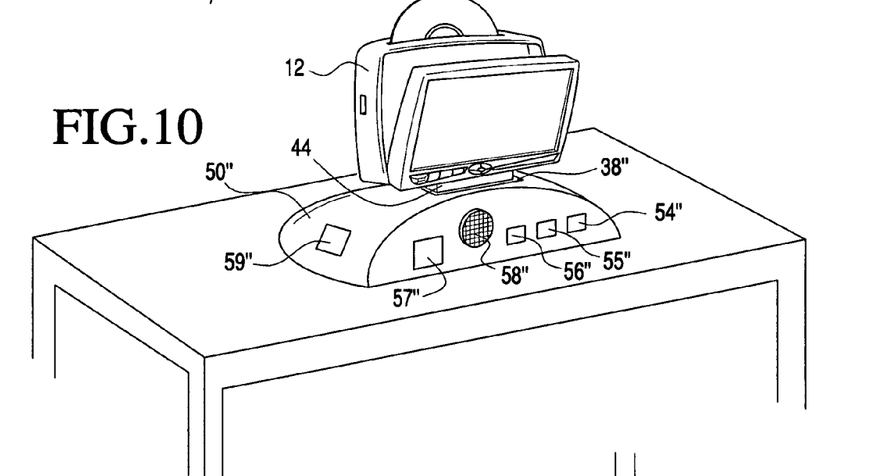
FIG. 10 shows the video system of FIG. 1 mounted within a mobile docking station.
Figure 11:
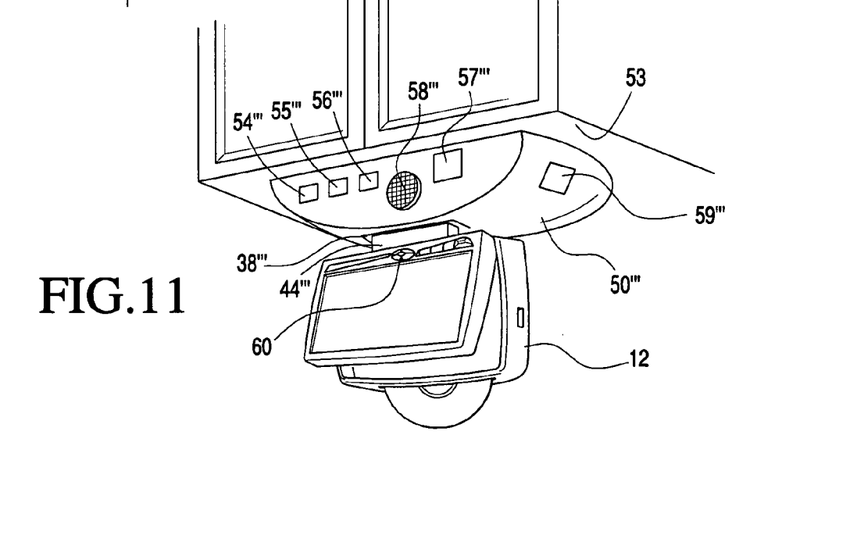
FIG. 11 shows the video system of FIG. 1 mounted within a static docking station.

As briefly mentioned above, the present video system 12 is adapted for removal from the headrest 14 of an automobile 11 for use at a variety of other locations. In accordance with a preferred embodiment of the present invention, the other locations are provide with a docking station 50', 50", 50''' including auxiliary cradles 38', 38", 38''' shaped and dimensioned for receiving the video system 12 and coupling the video system 12 to power sources and a/v sources in a manner similar to the cradle 38 used in conjunction with the headrest 14.

For example, and with reference to FIG. 9, a docking station 50' for use in conjunction with the dash 52 of a conventional automobile 11. The docking station 50' includes an auxiliary cradle 38' (with electrical connections and a connecting mechanism (not shown)) shaped and dimensioned for receiving and securely holding the video system 12 and coupling the video system 12 to power sources and a/v sources in a manner similar to the cradle 38 used in conjunction with the headrest 14. The docking station 50' is mounted upon the dash 52 of an automobile 11 and is wired for connection to a power source and a/v sources (not shown). In addition, the dash docking station 50' may include an integrated satellite receiver 54' for providing satellite content to the passenger of the automobile 11 by transmitting the satellite signal through the cradle 38' and into the video system 12 via the respective electrical connections of the cradle 38' and the video system 12. This embodiment is particularly useful where the video system 12 includes functionality relating to the provision of GPS guidance information. With this in mind, the driver will be able to selectively use the video system 12 for accessing guidance information when needed and return the video system 12 to the headrest 14 when guidance information is no longer needed.

With reference to FIG. 10, a mobile docking station 50" may also be provided. The mobile docking station 50" also includes an auxiliary cradle 38" (with electrical connections and a connecting mechanism (not shown)) shaped and dimensioned for receiving and securely holding the video system 12 and coupling the video system 12 to power sources and a/v sources in a manner similar to the cradle 38 used in conjunction with the headrest 14. The docking station 50" may include a battery pack 55", a/v inputs 56", a/v outputs 57", internet capability, speakers 58", cable input 59" and/or an integrated satellite receiver 54". These components are linked to the video system 12 via the cradle 38" which transmits the relevant signals to and from the video system 12 via the respective electrical connections of the cradle 38" and the video system 12.

With reference to FIG. 11, yet a further embodiment of a docking station 50''' is disclosed. This docking station 50''' is adapted for static mounting within a household, office or other locations (for example, beneath a kitchen cabinet 53'''). The docking station 50''' includes an auxiliary cradle 38''' (with electrical connections and a connecting mechanism (not shown)) shaped and dimensioned for receiving and securely holding the video system 12 and coupling the video system to power sources and a/v sources in a manner similar to the cradle 38 used in conjunction with the headrest 14. The docking station 50''' may include a battery pack 55''', a/v inputs 56''', a/v outputs 57''', Internet capability, speakers 58''', cable input 59''' and/or an integrated satellite receiver 54'''. These components are linked to the video system 12 via the cradle 38''' which transmits the relevant signals to and from the video system 12 via the respective electrical connections of the cradle 38''' and the video system 12.

As shown in FIG. 11, when the video system 12 is mounted beneath a kitchen cabinet 53 as shown, it may be necessary to mount the video system 12 upside down when compared to its mounting within an automobile headrest 14. With this in mind, the video system 12 is provided with the ability to rotate to the image shown on the video monitor 16 so that the video system 12 may be used in a variety of orientation. The possible rotation of the image shown on the video monitor 16 is complimented by the multifunctional controller 60 that adjusts to rotation of the image such that the controller 60 is calibrated to function in accordance with the orientation of the screen image.

In addition to providing for the inclusion of a removable video system 12 within the headrest 14 of an automobile 11 as shown above with reference to FIGS. 1 to 11, it is further contemplated an entertainment system 110 providing for a selectively removable video system 112 mounted within the ceiling of an automobile 111. In accordance with this alternate embodiment, and with reference to FIG. 12 to 17, the video system 112 is selectively mounted to an overhead cradle 138.

As those skilled in the art will certainly appreciate, the ceiling mounted system and the headrest mounted system may be integrated within a single vehicle to provide for a choice between a ceiling mount use and a headrest mount use. This would requiring the use of a universal cradle structure allowing the owner to move the video system from one location to another location without needing to incur the cost of purchasing a video system for each location. The individual could place the video system within the ceiling mounted cradle when many people are riding the automobile and move the video system to the headrest when only one passenger is viewing the media present upon the video system.

Figure 12:
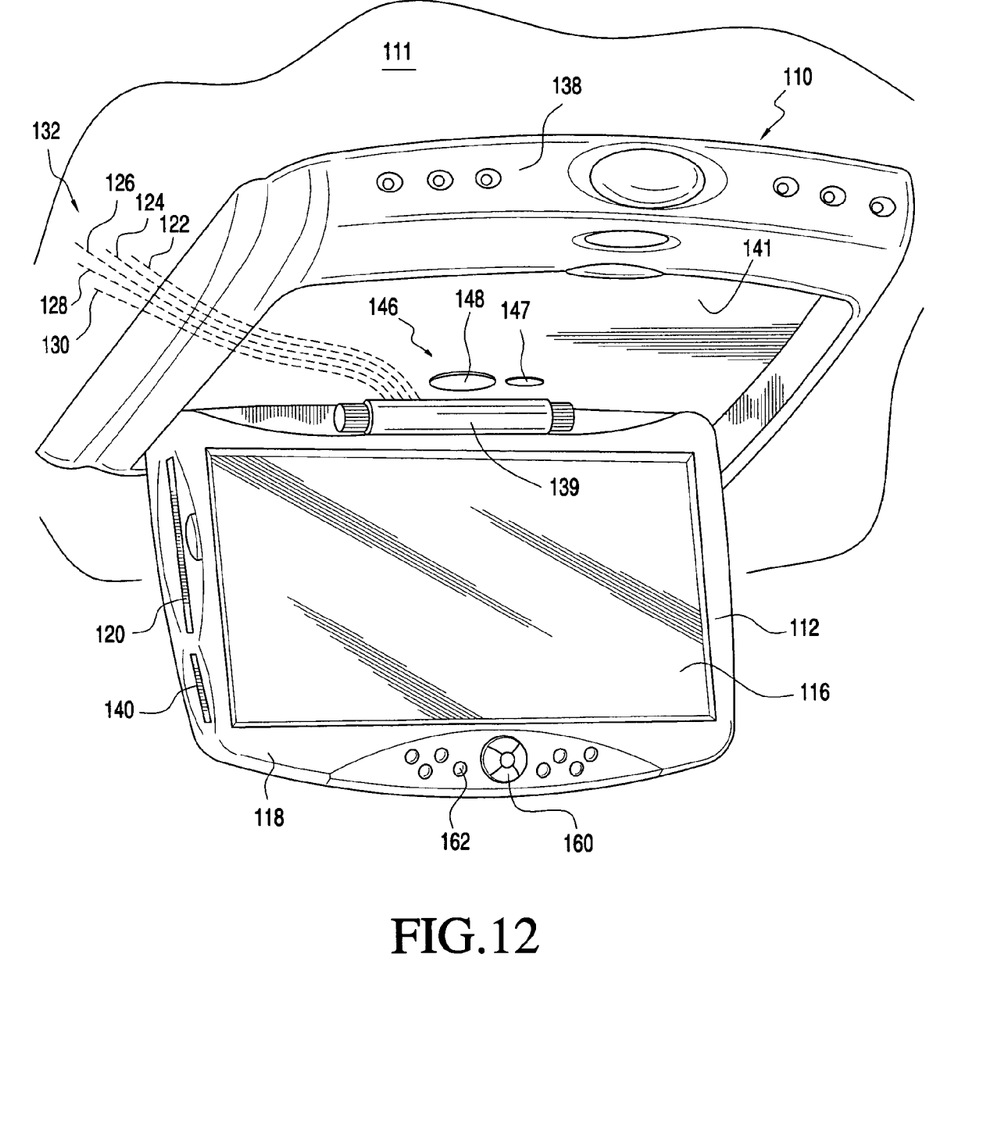
FIG. 12 is a front view of an automobile entertainment system in accordance with an alternate embodiment of the present invention.

As with the embodiment disclosed above, the video system 112 is detachably mounted within a cradle 138 secured to the ceiling of an automobile 111. The video system 112 generally includes a video monitor 116 for presenting media content and a video source 120 integrated therewith.

In accordance with a preferred embodiment of the present invention, the video source is a DVD player 120 coupled to the video monitor 116 for the transmission of video content thereto. That is, the DVD player 120 or other video source is integrated within the same video housing 118 as the video monitor 116. However, and as discussed above with reference to embodiment disclosed in FIGS. 1 to 11, the video source may take a variety of forms without departing from the spirit of the present invention.

The video system 112 is mounted to the cradle 138 for viewing in the rear of the automobile 111. With this in mind, the housing 118 of the video system 112 is provided with a pivotal coupling member 139 allowing the video system 112 to pivot relative to the cradle 138 for storage when the video system 112 is not in use. It is also contemplated that the coupling member 139 may be designed to provide for rotation of the housing 118 about multiple axes. In this way, the video system 112 may be freely rotated to improve viewing regardless of the where the video system 112 is being used.

The video monitor 116, DVD player 120 and associated control components are mounted within the housing 118. In accordance with a preferred embodiment, the video monitor 116 is a TFT LCD screen. However, it is contemplated that other monitor constructions, for example, plasma, Ultra High Definition VGA, touch screen VGA, fabric based monitors (e.g., flexible TFT) etc., may be used without departing from the spirit of the present invention.

With regard to the DVD player 120, it is integrally molded within the housing 118 and positioned for insertion of the DVDs behind the video monitor 116. By mounting the DVD player 120 in this way, a stable structure is developed that is well adapted for the automobile environment. While the DVD player 120 is disclosed as being a slot-loaded design with insertion behind the video monitor 116, the DVD player could take a variety of other forms without departing from the spirit of the present invention.

Figure 13:
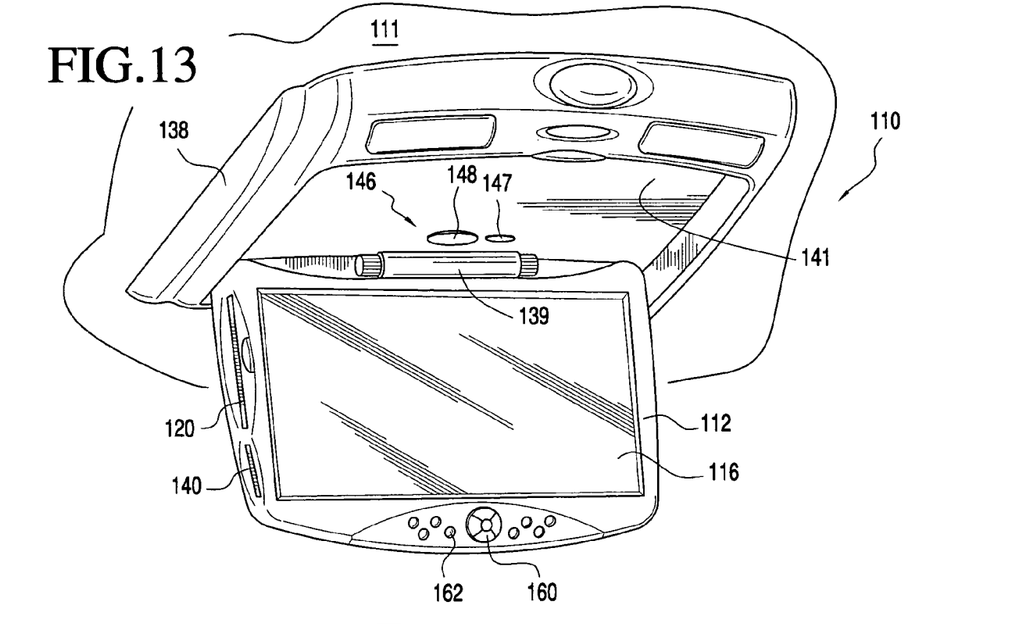
FIGS. 13 and 14 are front perspective views showing the entertainment system of FIG. 12 with the video system coupled to the cradle and detached from the cradle.
Figure 14:
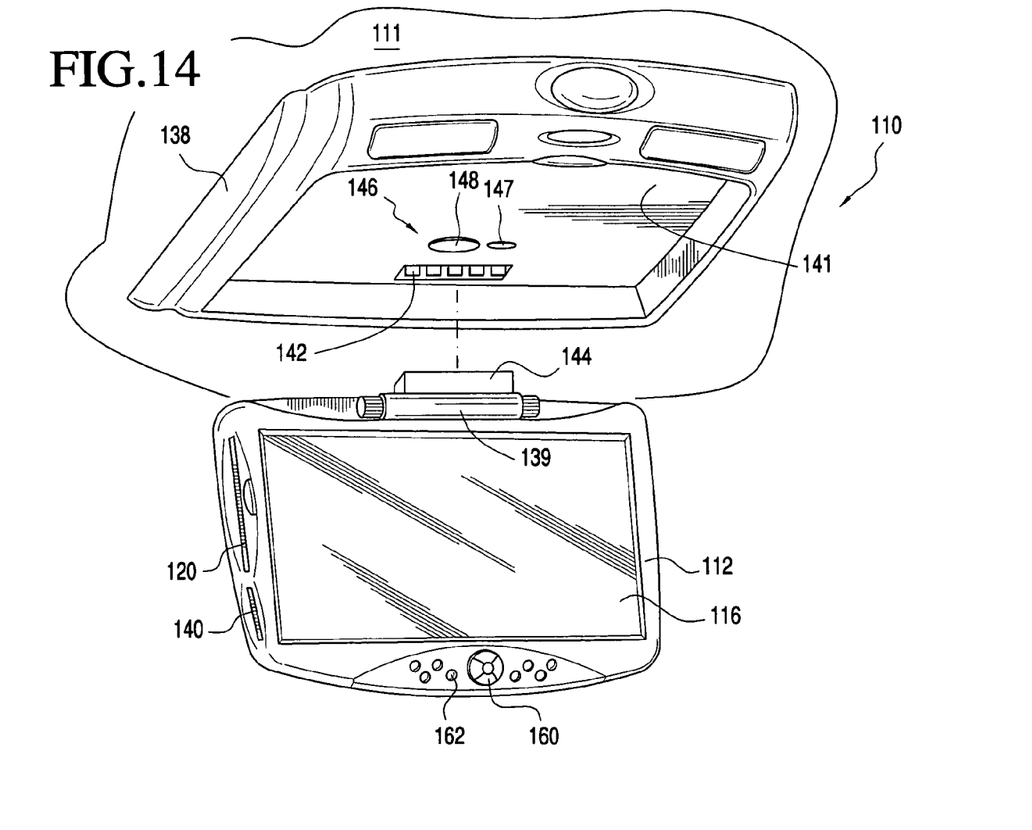

As briefly mentioned above, the housing 118 is detachably secured to the ceiling mounted cradle 138. In particular, the housing 118, including the video monitor 116, DVD player 120 and other related components, is detachably mounted within a recess 141 formed in the cradle 138. As such, the video system 112 may be removed from the automobile 111 and used at a variety of locations apart from the automobile 111. As will be discussed below in greater detail, the video system 112 may be used alone or in conjunction with a docking station 150', 150", 150'''. Once removed, the video system 112 may be used in other automobiles or within an individual's home. When used alone, a battery pack may be connected to the video system 112 and the video system 112 can thereby become a portable entertainment system.

The cradle 138 is shaped and dimensioned for receiving and securing the video system 112 to the ceiling of the automobile 111. As was discussed above with reference to the headrest based system, similar cradles 138', 138", 138''' may be provided at other locations permitting use of the video system 112 at other remote locations.

More specifically, the cradle 138 utilized in accordance with a preferred embodiment of the present invention includes quick release electrical connections 142 for the audio input 122, audio output 124, video input 126, video output 128 and power supply 130. The video system 112 similarly includes mating electrical connections 144 for transmitting electricity and a/v signals between the cradle 138 and the video system 112. In particular, when the video system 112 is mounted upon the cradle 138 the respectively electrically connections 142, 144 mate to provide for the transmission of power and a/v signals between the video system 112 and the cradle 138. As those skilled in the art will certainly appreciate, other readily removable electrical connections for other purposes may also be supplied if one determines they are so needed.

In addition to the electrical connections provided on the cradle 138, the cradle 138 also includes a connecting mechanism 146 designed for selectively retaining the video system 112 within the cradle 138. The connecting mechanism 146 permits ready and selective attachment of the video system 112 to the ceiling of the automobile 111 while preventing vibrations and other damaging movements that commonly occur in an automobile 111.

In accordance with a preferred embodiment of the present invention, the connecting mechanism 146 includes a release button 147 and a latch member 148. The release button 147 is actuated to rotate the latch member 148 and permit removal of the video system 112 from the cradle 138. Insertion of the video system 112 within the cradle recess 141 is achieved by simply setting the video system 112 within the recess 141 of the cradle 138 and overcoming the rotational force of the latch member 148 to force the video system 112 into a secure position. While a particular coupling structure is disclosed in accordance with a preferred embodiment of the present invention, those skilled in the art will appreciate that a variety of selectively releasable coupling structures may be employed without departing from the spirit of the present invention.

The entertainment system further includes cables 132 extending through the ceiling and the cradle 138. These cables 132 ultimately link audio, video and power to the cradle 138 and video system 112. More specifically, the cradle 138 and video system 112 are electrically connected to the remainder of the automobile 111 via electrical communication lines in a manner know to those skilled in the art.

As discussed above, specific wiring arrangements and linking of various video systems within an automobile in accordance with preferred embodiments of the present invention are disclosed in commonly owned patent applications that are incorporated herein by reference.

The present video system 112 is provided with the ability to offer a variety of functionalities. These functionalities may be hardwired or programmed within the video system 112 or the functionalities may be added in a modular manner via an expansion slot 140 provided within the video system 112. Contemplated functionalities include, but are not limited to satellite radio (for example, Serius, XM, satellite television (for example, DirecTV), GPS guidance systems, quick release battery packs, memory cards, wireless internet access (for example, Wi-Fi), Bluetooth, digital video recorders, digital video reception and recording, digital video inputs, video conferencing, cellular digital, cellular digital with a camera, etc.

In addition, and in accordance with a preferred embodiment, a broadcast television receiver and an antenna as discussed above with reference to the prior embodiment shown in FIG. 2 is integrated with the video system 112.

Control of the video system 112, including the video monitor 116, DVD player 120 and other components of the video system 112, is facilitated by the provision of control buttons along the outer surface of the video system 112. In accordance with a preferred embodiment of the present invention, the control buttons take the form of a multifunction controller 160 permitting movement of a cursor shown upon various interfaces displayed upon the video. In addition, conventional control buttons 162 may also be provided for control of traditional functions. In addition to the provision of manual control buttons, the video system 112 may further include a remote control (not shown) such that an individual need not actually touch the video system 112 to control the video content or the volume generated by the video system 112.

Figure 15:
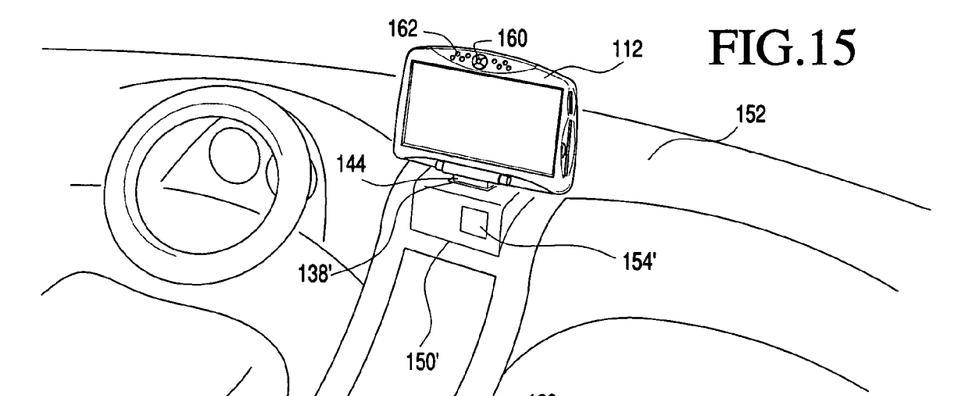
FIG. 15 shows the video system of FIG. 12 mounted within a dash docking station.
Figure 16:
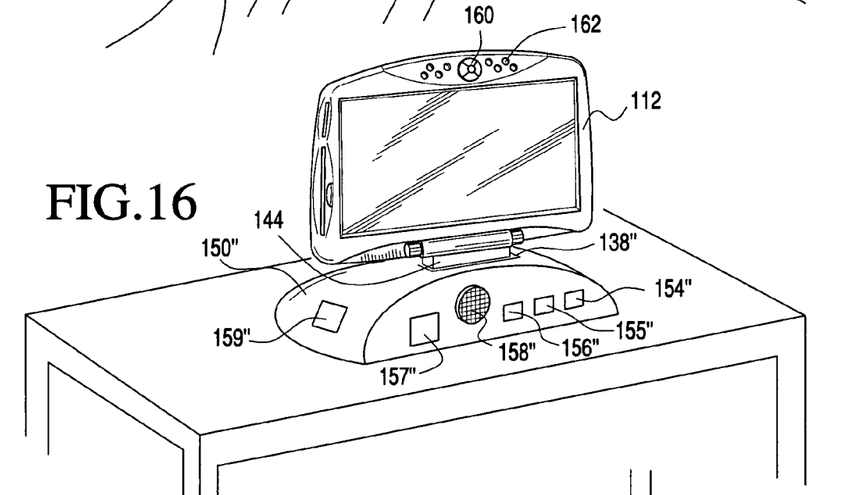
FIG. 16 shows the video system of FIG. 12 mounted within a mobile docking station.
Figure 17:
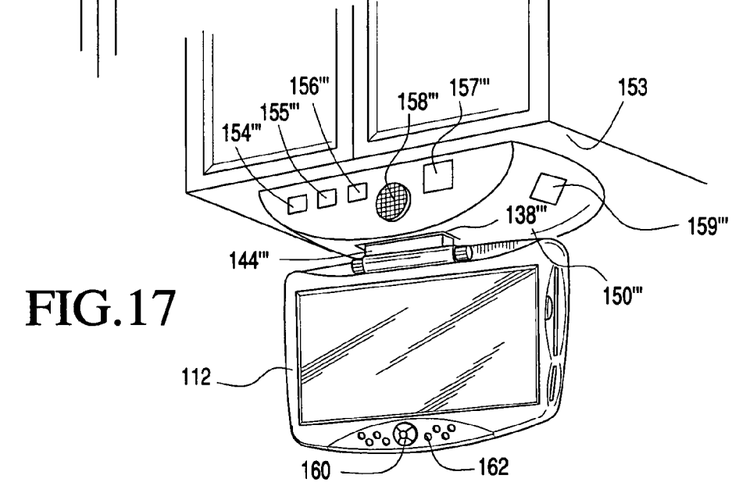
FIG. 17 shows the video system of FIG. 12 mounted within a static docking station.

As briefly mentioned above, the present video system is adapted for removal from the ceiling cradle 138 of an automobile 111 for use at a variety of other locations. In accordance with a preferred embodiment of the present invention, the other locations are provide with docking stations 150', 150", 150'" including auxiliary cradles 138', 138", 138'" shaped and dimensioned for receiving the video system 112 and coupling the video system 112 to power sources and a/v sources in a manner similar to the cradle 138 used in conjunction with the ceiling.

For example, and with reference to FIG. 15, a docking station 150' for use in conjunction with the dash 152 of a conventional automobile 111. The docking station 150' includes an auxiliary cradle 138' (with electrical connections and a connecting mechanism (not shown)) shaped and dimensioned for receiving and securely holding the video system 112 and coupling the video system 112 to power sources and a/v sources in a manner similar to the cradle 138 used in conjunction with the headrest 114. The docking station 150' is mounted upon the dash 152 of an automobile 111 and is wired for connection to a power source and a/v sources. In addition, the dash docking station 150' may include an integrated satellite receiver 154' for providing satellite content to the passengers of the automobile 111 by transmitting the satellite signal through the cradle 138' and into the video system 112 via the respective electrical connections of the cradle 138' and the video system 112. This embodiment is particularly useful where the video system 112 includes functionality relating to the provision of GPS guidance information. With this in mind, the driver will be able to selectively use the video system 112 for accessing guidance information when needed and return the video system 112 to the ceiling cradle 138 when guidance information is no longer needed.

With reference to FIG. 16, a mobile docking station 150" may also be provided. The mobile docking station 150" also includes an auxiliary cradle 138" (with electrical connections and a connecting mechanism (not shown)) shaped and dimensioned for receiving and securely supporting the video system 112 and coupling the video system 112 to power sources and a/v sources in a manner similar to the cradle 138 used in conjunction with the ceiling. The docking station 150" may include a battery pack 155", a/v inputs 156", a/v outputs 157", internet capability, speakers 158", cable input 159" and/or an integrated satellite receiver 154". These components are linked to the video system 112 via the cradle 138" which transmits the relevant signals to and from the video system 112 via the respective electrical connections of the cradle 138" and the video system 112.

As shown in FIG. 15 and 16, when the video system 112 is mounted to the docking stations 150', 150", it may be necessary to mount the video system 112 upside down when compared to its mounting within an automobile 111. With this in mind, the video system 112 is provided with the ability to rotate to the image shown on the video monitor 116 so that the video system 112 may be used in a variety of orientation. The possible rotation of the image shown on the video monitor 116 is complimented by the multifunctional controller 160 that adjusts to rotation of the image such that the controller 160 is calibrated to function in accordance with the orientation of the screen image.

With reference to FIG. 17, yet a further embodiment of a docking station 150'" is disclosed. This docking station 150'" is adapted for static mounting within a household, office or other locations (for example, beneath a kitchen cabinet 153). The docking station 150'" includes an auxiliary cradle 138'" (with electrical connections and a connecting mechanism (not shown)) shaped and dimensioned for receiving and securely supporting the video system 112 and coupling the video system 112 to power sources and a/v sources in a manner similar to the cradle 138 used in conjunction with the ceiling. The docking station 150''' may include a battery pack 155''', a/v inputs 156''', a/v outputs 157''', Internet capability, speakers 158''', cable input 159''' and/or an integrated satellite receiver 154'''. These components are linked to the video system 112 via the cradle 138''' which transmits the relevant signals to and from the video system 112 via the respective electrical connections of the cradle 138''' and the video system 112.

While the preferred embodiments have been shown and described, it will be understood that there is no intent to limit the invention by such disclosure, but rather, is intended to cover all modifications and alternate constructions falling within the spirit and scope of the invention as defined in the appended claims.

The invention claimed is:

1. A vehicle entertainment system, comprising:
    a headrest docking station formed within a headrest in a vehicle, wherein the headrest docking station includes a first auxiliary cradle, and is defined by a rear surface formed within the headrest, first and second opposing sidewalls formed within the headrest, a bottom surface formed within the headrest and between the first and second opposing sidewalls, and an opening formed in a top surface of the headrest opposing the bottom surface and extending from the first sidewall to the second sidewall;
    a video system configured to be detachably mounted within the headrest docking station comprising a display, a media player and a protruding electrical connector protruding from an exterior surface of the video system; and
    a remote docking station located remote from the headrest, wherein the first auxiliary cradle is shaped and dimensioned to receive the protruding electrical connector, and includes a first connecting mechanism configured to securely hold the video system in the headrest docking station, and a first electrical connection configured to provide power to the video system and transmit audio signals and video signals to or from the video system, and
    the remote docking station includes a second auxiliary cradle shaped and dimensioned to receive the protruding electrical connector, and the second auxiliary cradle includes a second connecting mechanism configured to securely hold the video system in the remote docking station, and a second electrical connection configured to provide power to the video system and transmit the audio signals and the video signals to or from the video system.

2. The vehicle entertainment system of claim 1, wherein the media player is a DVD player.

3. The vehicle entertainment system of claim 2, wherein a receiving slot of the DVD player is disposed in a portion of the video system corresponding to the opening formed in the top surface of the headrest.

4. The vehicle entertainment system of claim 1, wherein the video system further comprises a wireless transmitter.

5. The vehicle entertainment system of claim 1, wherein the video system further comprises an expansion slot configured to connect to an external device.

6. The vehicle entertainment system of claim 1, further comprising:
    a latch member disposed on the rear surface of the headrest docking station, configured to attach the video system to the headrest docking station; and
    a release button disposed on the headrest, configured to rotate the latch member and release the video system from the headrest docking station.

7. The vehicle entertainment system of claim 6, wherein the release button is disposed adjacent to the opening opposing the bottom surface formed within the headrest.

8. The vehicle entertainment system of claim 1, wherein the remote docking station is formed within a dash in the vehicle.

9. The vehicle entertainment system of claim 1, wherein the remote docking station is formed within a ceiling in the vehicle.

* * * * *